United States Patent [19]

Neukomm

[11] Patent Number: 4,614,085

[45] Date of Patent: Sep. 30, 1986

[54] GAS ENGINE

[75] Inventor: Peter Neukomm, Wettingen, Switzerland

[73] Assignee: PEWA Technic AG, Dietikon, Switzerland

[21] Appl. No.: 691,691

[22] Filed: Jan. 15, 1985

[30] Foreign Application Priority Data

Jan. 25, 1984 [CH] Switzerland ........................... 316/84

[51] Int. Cl.$^4$ ............................................... F16D 31/02

[52] U.S. Cl. ........................................... 60/370; 60/407

[58] Field of Search ................. 60/370, 407, 646, 657, 60/659, 668, 651, 671; 244/53 R, 53 A

[56] References Cited

U.S. PATENT DOCUMENTS

| | | | |
|---|---|---|---|
| 1,189,067 | 6/1916 | Davenport | 244/53 A |
| 4,166,441 | 9/1979 | Grigsby | 123/180 R |
| 4,211,083 | 7/1980 | Ueno | 60/626 |

FOREIGN PATENT DOCUMENTS

| | | |
|---|---|---|
| 253141 | 4/1912 | Fed. Rep. of Germany . |
| 381677 | 1/1922 | Fed. Rep. of Germany . |
| 3034854 | 5/1982 | Fed. Rep. of Germany . |
| 1553678 | 10/1979 | United Kingdom . |

*Primary Examiner*—Stephen F. Husar
*Attorney, Agent, or Firm*—Werner W. Kleeman

[57] ABSTRACT

A piston of a gas engine is reciprocatingly guided in a cylinder. A gas inlet valve whose valve closure component consists of a ball is situated in the cylinder head. The ball is pushed open in the top dead-center position of the piston by a protrusion formed on the upper portion of the piston in order to admit propellant gas into an expansion chamber formed by the cylinder. The gas engine must be set into operation by turning a crankshaft. If the piston accidentally lies near top dead-center when starting, the piston must be moved against full gas pressure. In order to alleviate starting, a shut-off device is provided which has a start position and an operational position. The shut-off device connects the inlet side of the gas inlet valve with an air conduit opening into ambient air and obturates a pressurized gas container in the start position. The shut-off device obturates the air conduit and clears a gas supply conduit leading from the pressurized gas container to the inlet side of the gas inlet valve in the operational position. With the help of this shut-off device, it is possible to start even gas motors equipped with gear-reduction transmissions.

6 Claims, 5 Drawing Figures

GAS ENGINE

CROSS REFERENCE TO A RELATED APPLICATION

This application is related to my presently copending, commonly assigned U.S. patent application Ser. No. 06/691,699, filed Jan. 15, 1985, and entitled "Gas Engine with Gas Supply Device".

BACKGROUND OF THE INVENTION

The present invention broadly relates to gas engines and, more specifically, pertains to a new and improved construction of a gas engine having a regulatable gas inlet valve.

Generally speaking, the gas engine of the present invention comprises a cylindrical expansion chamber closed by the gas inlet valve and a piston reciprocating in the cylinder as well as a gas supply conduit leading from a pressurized gas container to the gas inlet valve.

In other words, the gas engine of the present invention comprises a regulatable gas inlet valve having an inlet side, a substantially cylindrical expansion chamber closed by the regulatable gas inlet valve, a reciprocatable piston arranged within the expansion chamber, a pressurized gas container and a gas supply conduit leading from the pressurized gas container to the gas inlet valve.

A gas engine of this type is known from the British Pat. No. 1,553,678, published Oct. 3, 1979. In this gas engine, a piston is reciprocatingly arranged within a cylindrical expansion chamber. The piston is connected with a crankshaft by a connecting rod. The crankshaft carries the propeller of a model aircraft. The cylinder head comprises a central bore closeable by a gas inlet valve. A ball lying in the cylinder head on the side remote from the cylinder space or expansion chamber upon a valve seat behind the central bore serves as a valve body. The cylinder head communicates through a gas supply conduit with a pressurized gas container containing carbon dioxide. The gas pressure presses the ball onto the valve seat and holds the gas inlet valve closed. The gas inlet valve is opened by a protrusion formed on the upper side of the piston in order to admit gas to flow into the expansion chamber. The gas inlet valve operates on the principle of a check valve or non-return valve. The protrusion pushes against the ball and raises it from the valve seat when the piston is located in the region of top dead-center at the end of its return stroke and the beginning of its working stroke. When shutting off the engine, the piston can come to a stop in the course of its return stroke shortly before attaining top dead-center or even in the top dead-center region. A restart of the motor is in this case difficult, since the piston must execute at least one partial stroke against full gas pressure in starting. It can also occur that the gas motor start in the incorrect direction of rotation for this reason. In toys, such as toy cars and other powered devices having gear-reduction transmissions between the engine shaft and the starter engagement shaft, a restart can even become impossible.

SUMMARY OF THE INVENTION

Therefore, with the foregoing in mind, it is a primary object of the present invention to provide a new and improved construction of a gas engine which does not exhibit the aforementioned drawbacks and shortcomings of the prior art constructions.

Another and more specific object of the present invention aims at providing a new and improved construction of a gas engine of the previously mentioned type which can be readily started in all positions of the piston within the cylinder, even when a gear-reduction transmission is interposed between the engine shaft or crankshaft and the location of the starting means.

A further object of the present invention aims at providing a new and improved construction of a gas engine of the previously mentioned type which can always be realiably started in the desired direction of rotation regardless of the position of the pistion within the cylinder.

Yet another object of the present invention aims at providing a new and improved construction of a gas engine of the previously mentioned type in which the manipulations required for starting the motor are as simple as possible.

Yet a further significant object of the present invention aims at providing a new and improved construction of a gas engine of the character described which is relatively simple in construction and design, extremely economical to manufacture, highly reliable in operation, not readily subject to break down and malfunction and requires a minimum of maintenance and servicing.

Now in order to implement these and still further objects of the invention, which will become more readily apparent as the description proceeds, the gas engine of the present invention is manifested by the features that at least one shut-off device having a start position and an operational position is provided which comprises at least one obturating or valve component and which connects the inlet side of the gas inlet valve with an air conduit opening to ambient air and obturates or closes off the pressurized gas container in the start position and which obturates the air conduit and clears or opens the gas supply conduit in the operational position.

In other words, the gas engine of the present invention is manifested by the features that it comprises an air conduit opening to ambient air, at least one shut-off device comprising one obturating or valve component, the shut-off device having a start position and an operational position, the shut-off device connecting the inlet side of the gas inlet valve with the air conduit and obturating or sealing off the pressurized gas container when in the start position and the shut-off device obturating the air conduit and clearing or opening the gas supply conduit when in the operational position.

Two obturating or valve components can be provided, the first connecting the inlet side of the gas inlet valve with the air conduit opening to ambient air in the start position and obturating the air conduit in the operational position while the second obturates the pressurized gas container in the start position and clears or opens the gas supply channel in the operational position. Both obturating or valve components can advantageously be jointly actuatable. A separate shut-off device can be provided for each of both obturating or valve components.

Advantageously, a manifold or multiple-way shut-off device is provided in which the two obturating components are two mutually connected valve closure components of which the valve closure component obturating the air conduit in the operational position acts as a check valve or non-return valve and maintains both valve closure components under the pressure prevailing in the pressurized gas container when in the operational position. The valve closure components can be externally pushed against the force acting on the check valve out of the operational position and into the start position.

The two valve closure components are advantageously formed upon a cylindrical shaft longitudinally translatably guided through two O-rings serving as a valve seat and held in parallel axially spaced relationship in two stationary components and in which both effective regions of the valve closure components are partially provided with longitudinal grooves. When the valve is opened, the portion provided with longitudinal grooves lies in the O-ring and when the valve is closed, the cylindrical portion without longitudinal grooves lies in the O-ring.

A manifold or multiple-way shut-off device can also be provided which comprises a three-way cock or rotary valve whose rotatable cock body or plug has a T-shaped bore and is held against a stop member in the operational position by a spring or elastic member and is pivotable into the start position. The third position of the three-way cock or rotary valve remains unused. A manifold or multiple-way shut-off device comprising a sliding or rotating valve gate held against a stop member in the operational position by a spring or elastic member is also advantageous.

BRIEF DESCRIPTION OF THE DRAWINGS

The invention will be better understood and objects other than those set forth above, will become apparent when consideration is given to the following detailed description thereof. Such description makes reference to the annexed drawings wherein throughout the various figures of the drawings there have been generally used the same reference characters to denote the same or analogous components and wherein.

DETAILED DESCRIPTION OF THE PREFERRED EMBODIMENTS

Figure 1:
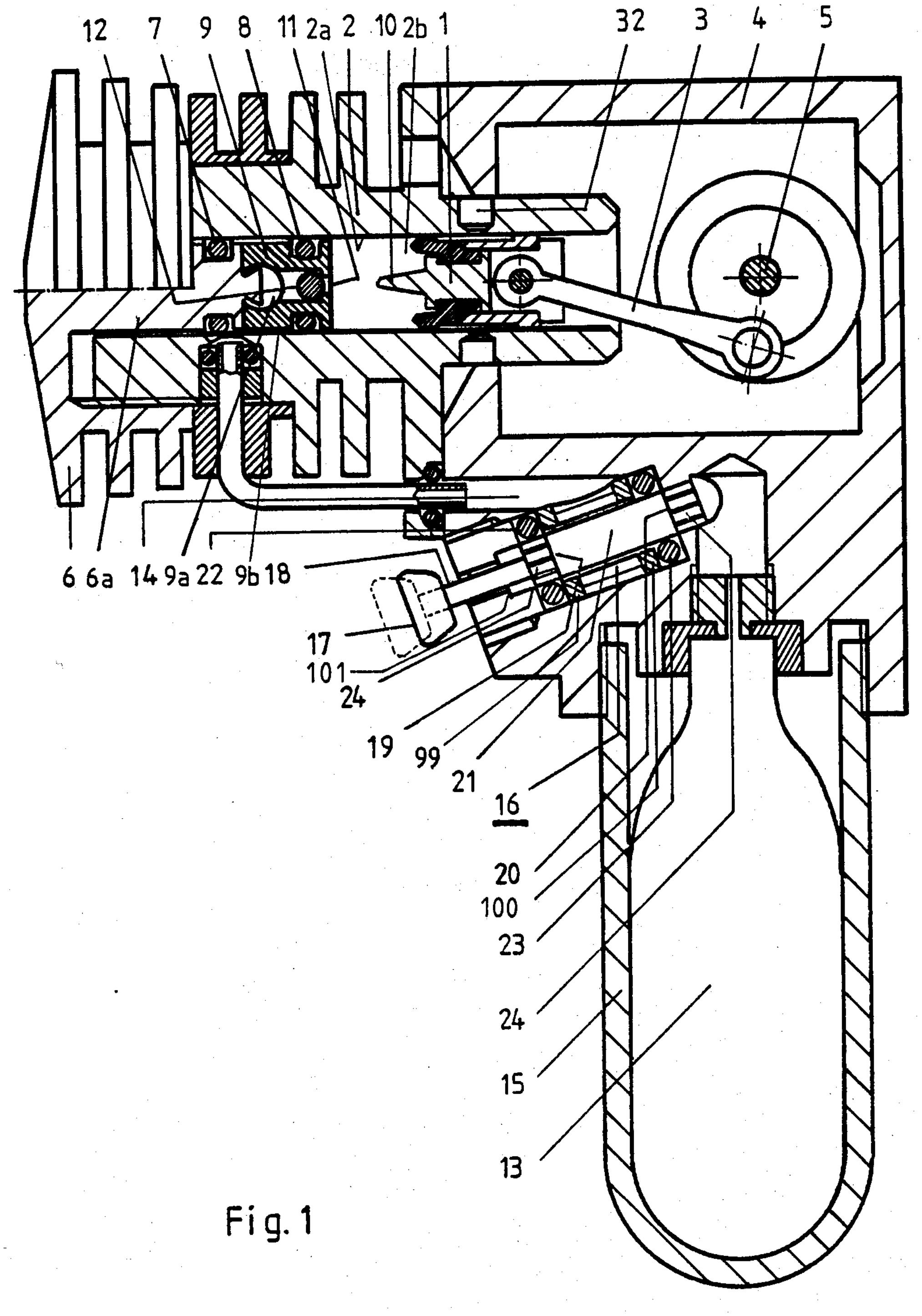
FIG. 1 schematically shows a gas engine having a manifold shut-off device in the start position in cross section.

Describing now the drawings, it is to be understood that to simplify the showing thereof only enough of the structure of the gas engine has been illustrated therein as is needed to enable one skilled in the art to readily understand the underlying principles and concept of this invention. Turning now specifically to FIG. 1 of the drawings, the apparatus illustrated therein by way of example and not limitation will be seen to comprise a piston 1 reciprocatingly guided in a cylinder 2 and connected by a connecting rod 3 with a crankshaft 5 journalled in a crark case or crankshaft housing 4. The crankshaft 5 can drive for instance the wheels of a model car through a not particularly shown transmission or for instance can directly drive the propeller of a model aircraft. The use of the gas engine is, however, not limited to toys or models.

A cylinder head 6 is screwed onto an extension of the cylinder 2 and protrudes into a bore **2*a* of the cylinder 2. The portion 6*a* of the cylinder head 6 protruding into the bore 2*a* of the cylinder 2 is provided with an O-ring 7. This portion 6*a* of the cylinder head 6 protruding into the bore 2*a* of the cylinder 2 carries a gas inlet valve 9 sealingly guided in the bore of the cylinder 2 by an O-ring 8. The closure component of the gas inlet valve 9 comprises a ball 12 which can be pushed open by a protrusion 10 formed on the upper side of the piston 1 through a gas inlet aperture or opening 11. By screwing the cylinder head 6 in and out, the gas inlet valve 9 is shifted in the bore 2*a* of the cylinder 2 which regulates the timing of valve opening and therefore the rotational speed of the gas engine. The gas expanded in the cylinder space or expansion chamber 2*b* escapes through an exhaust aperture or port 32 at the lowermost or bottom dead-center position of the piston 1**.

A gas supply channel or conduit 14 is provided between the gas inlet valve 9 and a pressurized gas container or reservoir 13 containing a suitable propellant gas for driving the gas engine. The pressurized gas container or reservoir 13 is, in this illustrative embodiment, a commercially available carbon dioxide cartridge containing liquified gas which is screwed to the crankshaft housing 4 by a sleeve 15.

Gas engines must be started by externally applied rotation. If the piston 1 should happen to lie in the vicinity of top dead-center during starting, the piston 1 must be moved against full gas pressure. This motion can usually be performed, although with difficulty, in gas engines with operative means, e.g. propellers, mounted directly on the crankshaft 5. If a gear-reduction transmission is arranged between the crankshaft 5 and a suitable component of the operating means provided for applying starting rotation to the gas engine, starting of the gas engine can be difficult or even be impossible. This can, for instance, be the case in toy or model cars where the friction of the wheels against the floor or ground limits the attainable torque for starting.

In order to make starting of the gas engine possible even in such cases, a manifold or multiple-way shut-off device 16 is provided in the arrangement according to FIG. 1. This manifold or multiple-way shut-off device 16 has an externally accessible actuating knob 17 which can assume a pressed-down or pressed-in start position and an operational position represented in dotted line in FIG. 1. In the start position, the inlet side of the gas inlet valve 9 is ventilated through an air conduit or channel 18 leading to the exterior, i.e. to ambient air, and the presssurized container or reservoir 13 is closed or obturated. For this purpose, the manifold or multiple-way shut-off device 16 is equipped with two valve closure components 19 and 20 which are mutually connected. Both valve closure components 19 and 20 are formed upon a cylindrical shaft 21 guided in two O-rings 22 and 23 serving as valve seats or seals and can block the passage of gas. The O-rings 22 and 23 are held in mutually parallel, axially spaced relationship by two stationarily arranged components 99 and 100, such as annular spring clips. The space between both O-rings 22 and 23 is in communication with the inlet side of the gas inlet valve 9 through the gas supply conduit 14, an interstitial annular void **9*b* formed between the gas inlet valve 9 and the cylinder wall 2*a* of the cylinder 2 as well as a cross channel 9*a* formed in the gas inlet valve 9. The sides of the O-rings 22 and 23 remote from this intervening space are in gas communication with the pressurized gas container or reservoir 13 and the air conduit or channel 18**.

The cylindrical shaft 21 is longitudinally translatable between stop members and is partially provided with longitudinal grooves 24 in both effective regions of the valve closure components 19 and 20. If the valve 4 ventilating the cylinder space or expansion chamber 2*b* between the inlet side of the gas inlet valve 9 and the air conduit or channel 18 is to be opened, then the cylindrical shaft 21 is pressed into the O-ring 22 until the longitudinal grooves 24 come to lie in the region of the O-ring 22. The gas can escape from the gas inlet valve 9 through the longitudinal grooves 24 into the air conduit or channel 18. In this position of the cylindrical shaft 21, the cylindrical portion of the valve closure component 20 arrives in the region of the O-ring 23 and obturates the pressurized gas container or reservoir 13.

If the actuating knob 17 is released, the cylindrical shaft 21 is pushed into the operational position shown in dotted line in FIG. 1 by the pressure prevailing in the pressurized gas container or reservoir 13 and acting upon the end face of the cylindrical shaft 21. A shoulder or stop member 101 holds the cylindrical shaft 21 in the operational position. In this operational position the longitudinal grooves 24 lie in the region of the O-ring 23. The gas supply conduit 14 from the pressurized gas container or reservoir 13 to the inlet side of the gas inlet valve 9 is thus continuously opened. The air conduit or channel 18 is obturated by the cylindrical portion of the valve closure component 19 lying in the region of the O-ring 22.

Figure 2:
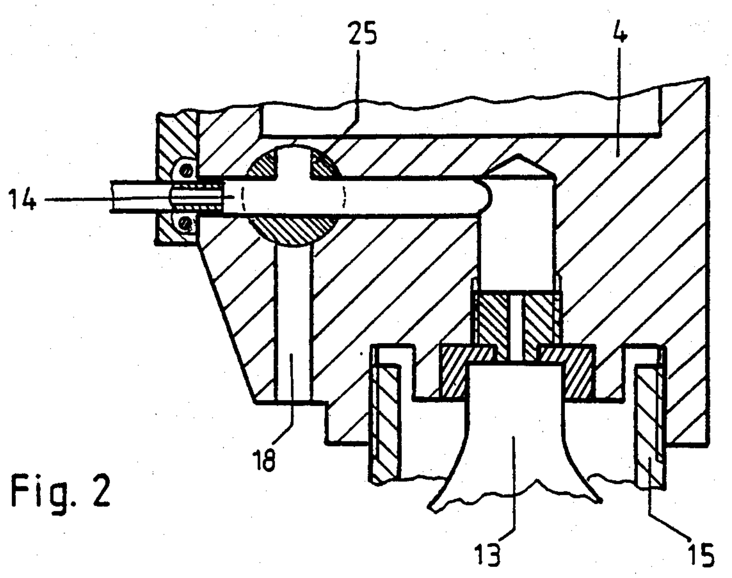
FIG. 2 schematically shows a manifold shut-off device comprising a three-way cock in the operational position.
Figure 3:
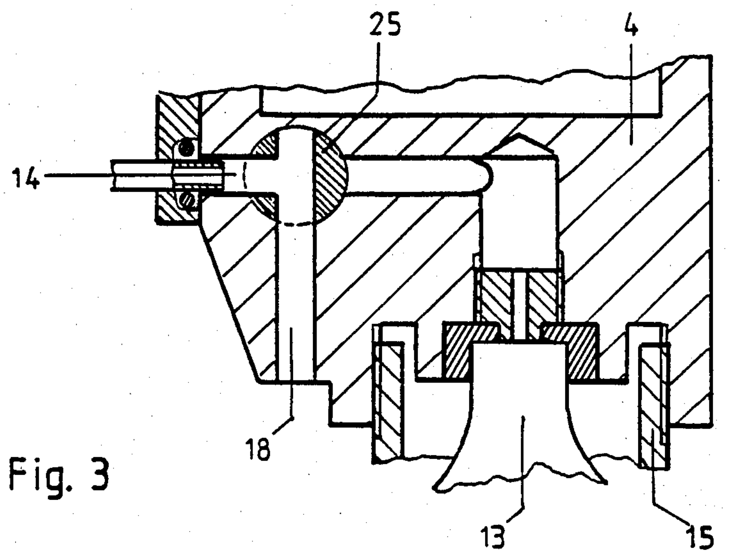
FIG. 3 schematically shows a manifold shut-off device comprising a three-way cock in the start position.

Only the portion of the gas engine containing a shut-off device is represented in the FIGS. 2 through 5. In the arrangement according to the FIGS. 2 and 3, a manifold or multiple-way shut-off device is illustrated which comprises a three-way cock or rotary valve. FIG. 2 shows the cock or valve body or plug rotatably journalled in the crankshaft housing 4 in its operational position, while FIG. 3 shows it in its start position. The cock body 25 is held against a not particularly shown stop member, such as the stop member 101 shown in FIG. 5, in the operational position by a not particularly shown spring or elastic member, such as return spring 29 likewise shown in FIG. 5. The cock or rotary valve body 25 can be pivoted out of this position against the elastic or spring force into the start position. When released, the cock or rotary valve body 25 returns to the operational position. The third position of the three-way cock or rotary valve remains unused.

Figure 4:
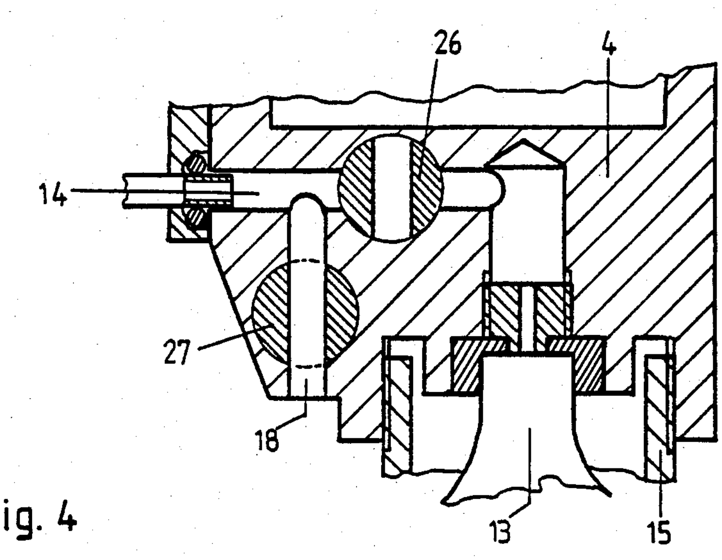
FIG. 4 schematically shows an arrangement having two separate shut-off devices for the gas supply conduit and the air conduit.

As can be seen from FIG. 4, two separate cock or rotary valve bodies 26 and 27 can also be employed as two separate shut-off devices.

Figure 5:
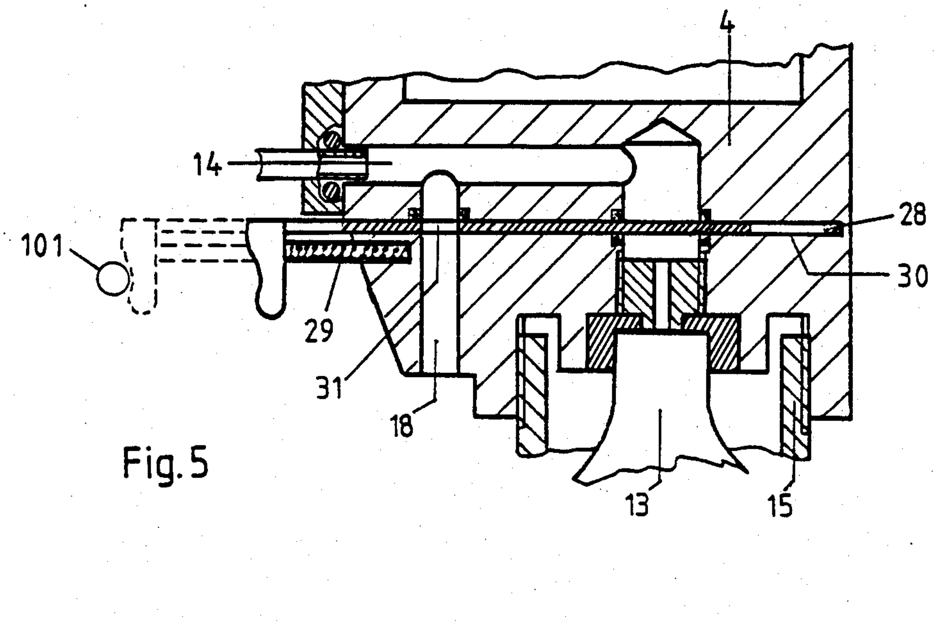
FIG. 5 schematically shows a manifold shut-off device comprising a gate or slide valve.

FIG. 5 shows a manifold or multiple-way shut-off device with a gate or slide valve 28. The gate or slide valve 28 is translatably guided in a slot formed in the crankshaft housing 4 and is held in the operational position by an elastic member or return spring 29. The gate or slide valve 28 is provided with two apertures 30 and 31 which alternatively open either the pressurized gas container or reservoir 13 or the air conduit 18. In the operational position, the return spring 29 holds the gate or slide valve 28 against a stop member 101.

While there are shown and described present preferred embodiments of the invention, it is to be distinctly understood that the invention is not limited thereto, but may be otherwise variously embodied and practiced within the scope of the following claims. Accordingly,

What we claim is

1. A gas engine, comprising:

a regulatable gas inlet valve having an inlet side;

a substantially cylindrical expansion chamber closable by said regulatable gas inlet valve;

a reciprocatable piston arranged within said expansion chamber;

a pressurized gas container;

a gas supply conduit leading from said pressurized gas container to said gas inlet valve;

an air channel opening to ambient air;

at least one shut-off device having a start position and an operational position and containing at least one valve component;

said at least one shut-off device connecting said inlet side of said gas inlet valve with said air channel and obturating said pressurized gas container when in said start position;

said at least one shut-off device obturating said air channel and clearing said gas supply conduit when in said operational position;

said at least one shut-off device comprising a first valve component for connecting said inlet side of said gas inlet valve with said air channel when in said start position and for obturating said pressurized gas container when in said operational position;

said at least one shut-off device comprising a second valve component for obturating said pressurized gas container when in said start position and for clearing said gas supply conduit when in said operational position;

said at least one shut-off device defining a manifold shut-off devece;

said first valve component comprising a first valve closure component;

said second valve component comprising a second valve closure component connected with said first valve closure component for obturating said air channel when in said operational position;

said second valve closure component acting as a check valve and maintaining both of said first valve closure component and said second valve closure component under said pressure prevailing in said pressurized gas container when in said operational position;

said pressure exerting a force on said chack valve; and said first valve closure component and said second valve closure component being capable of being externally pushed against said force exerted on said check valve from said operational position into said start position.

2. The gas engine as defined in claim 1, wherein:

said first valve component and said second valve component are conjointly actuatable.

3. The gas engine as defined in claim 1, wherein:

said first and second valve components define separate shut-off devices.

4. The gas engine as defined in claim 1, wherein:

said first valve closure component and said second valve closure component are provided on a substantially cylindrical shaft;

two O-rings through which said substantially cylindrical shaft is longitudinally translatably guided;

said two O-rings serving as valve seats and being held in mutually parallel axially spaced relationship by stationary components;

said substantially cylindrical shaft being capable of contacting a stop member at least in said operational position;

said first valve closure component and said second valve closure component possessing two effective regions; and said substantially cylindrical shaft being partially provided with longitudinal grooves on both of said two effective regions of said first valve closure component and said second valve closure component such that at least one grooved portion of said substantially cylindrical shaft is grooved and a smooth portion is fully substantially cylindrical and such that said at least one grooved portion of said substantially cylindrical shaft lies in an associated one of said two O-rings when in an open-valve state and said smooth portion of said substantially cylindrical shaft lies in an associated one of said two O-rings when in a closed-valve state.

5. A gas engine, comprising:

a regulatable gas inlet valve having an inlet side;

a substantially cylindrical expansion chamber closable by said regulatable gas inlet valve;

a reciprocatable piston arranged within said expansion chamber;

a pressurized gas container;

a gas supply conduit leading from said pressurized gas container to said gas inlet valve;

an air channel opening to ambient air;

at least one shut-off device having a start position and an operational position and containing at least one valve component;

said at least one shut-off device connecting said inlet side of said gas inlet valve with said air channel and obturating said pressurized gas container when in said start position;

said at least one shut-off device obturating said air channel and clearing said gas supply conduit when in said operational position;

said at least one shut-off device comprising a manifold shut-off device comprising a three-way rotary valve;

said three-way rotary valve containing a rotary valve body provided with a substantially T-shaped bore;

a stop member;

an elastic member holding said rotary valve body against said stop member in said operational position defining a first position;

said rotary valve body being rotatably into said start position defining a second position; and a third position of said rotary valve body of said three-way rotary valve remaining unused.

6. A gas engine comprising:

a regulatable gas inlet valve having an inlet side;

a substantially cylindrical expansion chamber closable by said regulatable gas inlet valve;

a reciprocatable piston arranged within said expansion chamber;

a pressurized gas container in which a propellant pressure prevails;

a gas supply conduit leading from said pressurized gas container to said gas inlet valve;

an air channel opening to ambient air;

at least one shut-off device arranged in said gas supply conduit;

said at least one shut-off device comprising at least two closure members each having a first operational position and a second start position corresponding to a start position of the gas engine;

said at least one shut-off device connecting said inlet side of said gas inlet valve with said pressurized gas container in said first operational position;

said at least one shut-off device connecting said inlet side of said gas inlet valve with said air channel in said second start position;

said gas inlet comprising a valve capable of being pushed open;

a manifold shut-off device comprising two mutually operatively interconnected valve closure members;

said two mutually operatively interconnected valve closure members comprising a first valve closure member and a second valve closure member;

said first valve closure member connecting said inlet side of said gas inlet valve with said air channel in said second start position of said at least one shut-off device;

said first valve closure member obturating said air channel in said first operational position for maintaining both of said two valve closure members under said propellant pressure prevailing in said pressurized gas container such that a force acts on said first valve closure member;

said second valve closure member obturating said pressurized gas container in said second start position;

said second valve closure member clearing said air channel between said inlet side of said gas inlet valve and said pressurized gas container in said first operational position; and both of said two valve closure members being externally pushable out of said first operational position into said second start position against said force acting on said first valve closure member.

* * * * *